United States Patent [19]
Ohya et al.

[11] Patent Number: 6,158,713
[45] Date of Patent: Dec. 12, 2000

[54] ELECTROMAGNETIC VALVE

[75] Inventors: Ikuo Ohya; Yasuhiro Murayama, both of Takatsuki, Japan

[73] Assignee: Techno Takatsuki Co., Ltd., Osaka-Fu, Japan

[21] Appl. No.: 09/040,279

[22] Filed: Mar. 18, 1998

[30] Foreign Application Priority Data

Mar. 19, 1997 [JP] Japan ................................. 9-066118
Feb. 12, 1998 [JP] Japan ................................ 10-030199

[51] Int. Cl.$^7$ ................................................. F16K 31/08
[52] U.S. Cl. ................... 251/65; 251/129.1; 251/129.21; 137/870
[58] Field of Search .................... 251/65, 129.1, 251/129.21; 137/557, 870

[56] References Cited

U.S. PATENT DOCUMENTS

| | | | |
|---|---|---|---|
| 4,486,053 | 12/1984 | Hawker et al. ......................... | 251/141 |
| 4,506,701 | 3/1985 | Masaki ............................... | 137/596.17 |
| 4,612,845 | 9/1986 | Burkel et al. ............................. | 251/65 |
| 4,674,536 | 6/1987 | Warrick ................................ | 251/129.1 |
| 4,690,371 | 9/1987 | Bosley et al. ......................... | 251/129.1 |
| 4,744,543 | 5/1988 | Renheim .................................. | 251/65 |

*Primary Examiner*—Kevin Shaver
*Assistant Examiner*—Eric Keasel
*Attorney, Agent, or Firm*—Armstrong, Westerman, Hattori, McLeland & Naughton

[57] ABSTRACT

An electromagnetic valve which opens and closes passages for fluid by moving movable valve elements by means of attraction of an electromagnet includes movable valve elements having fluid passages and disposed inside a cylindrical electromagnet. The movable valve elements are disposed in the fluid passage inside the electromagnet so that supply and exhaust of fluid and switching between two directions can be performed.

28 Claims, 23 Drawing Sheets

ELECTROMAGNETIC VALVE

BACKGROUND OF THE INVENTION

The present invention relates to an electromagnetic valve. More specifically, the present invention relates to an electromagnetic valve which can perform switching between supply and exhaust of a fluid to and from an air mat M or the like, or which can perform switching supply of a fluid to an air mat divided into a plurality of zones.

As shown in FIG. 23, one of the conventional electromagnetic valves comprises an electromagnet 100, an internal cylinder 101 which has a bottom and is inserted into the electromagnet 100, a movable valve member 103 which is provided inside the internal cylinder 101 and supported by a spring 102, and a casing 106 which is attached to the end surfaces of the electromagnet 100 and includes an air supply passage 104 and an air exhaust passage 105. According to this electromagnetic valve, when the electromagnet 100 is not electrified, a valve disc 107 is pressed against a valve seat 108 by the force of the spring 102, so as to block the flow of air. On the other hand, when the electromagnet 100 is electrified, the attraction of the electromagnet 100 makes the movable valve 103 move against the spring 102 to allow the valve disc 107 be moved away from the valve seat 108, so that air can be supplied.

However, in order to supply and exhaust air, this electromagnetic valve requires an adapter which performs switching between the passages to exhaust air. Furthermore, in order to switch the supply of a fluid to an air mat which is divided into a plurality of zones, two sets of such electromagnetic valve and additional adapter for combining them is needed. As a result, there are problems that the structure is complicated, the production cost is increased, and the operability is deteriorated.

In view of these circumstances, the present invention has an object of providing an electromagnet valve whose production cost is inexpensive and which can perform switching among various passages for a fluid.

SUMMARY OF THE INVENTION

The electromagnetic valve of the present invention is an electromagnetic valve which opens and closes passages for fluid by moving movable valves by means of attraction of an electromagnet and is characterized by comprising first and second movable valves having fluid passages and disposed inside the cylindrical electromagnet.

The electromagnetic valve of the present invention is an electromagnetic valve which opens and closes passages for fluid by moving movable valves by means of attraction of electromagnets, and is characterized by comprising a central supporter having a fluid passage, first and second cylindrical electromagnets which are disposed both sides of the supporter, first and second movable valves which are disposed inside the first and second electromagnets, respectively, and have fluid passages, and casings which are attached to the open ends of the first and second electromagnets, respectively, and have fluid passages.

The electromagnetic valve of the present invention is an electromagnetic valve which opens and closes passages for fluid by moving movable valves by means of attraction of an electromagnet, and is characterized by comprising a cylindrical electromagnet, first and second movable valves which are disposed inside the electromagnet and have fluid passages, and casings which are attached to the open ends of the electromagnet and have fluid passages.

Furthermore, the electromagnetic valve of the present invention is an electromagnetic valve which opens and closes passages for fluid by moving movable valves by means of attraction of an electromagnet, and is characterized by comprising a cylindrical electromagnet, first and second movable valves which are disposed inside the electromagnet and have fluid passages, and casings which are attached to the open ends of the electromagnet and have fluid passages, the electromagnet having a fluid passage which runs between the first and second movable valves.

DETAILED DESCRIPTION OF THE INVENTION

The electromagnetic valve of the present invention will be described below based on the attached drawings.

Figure 1:
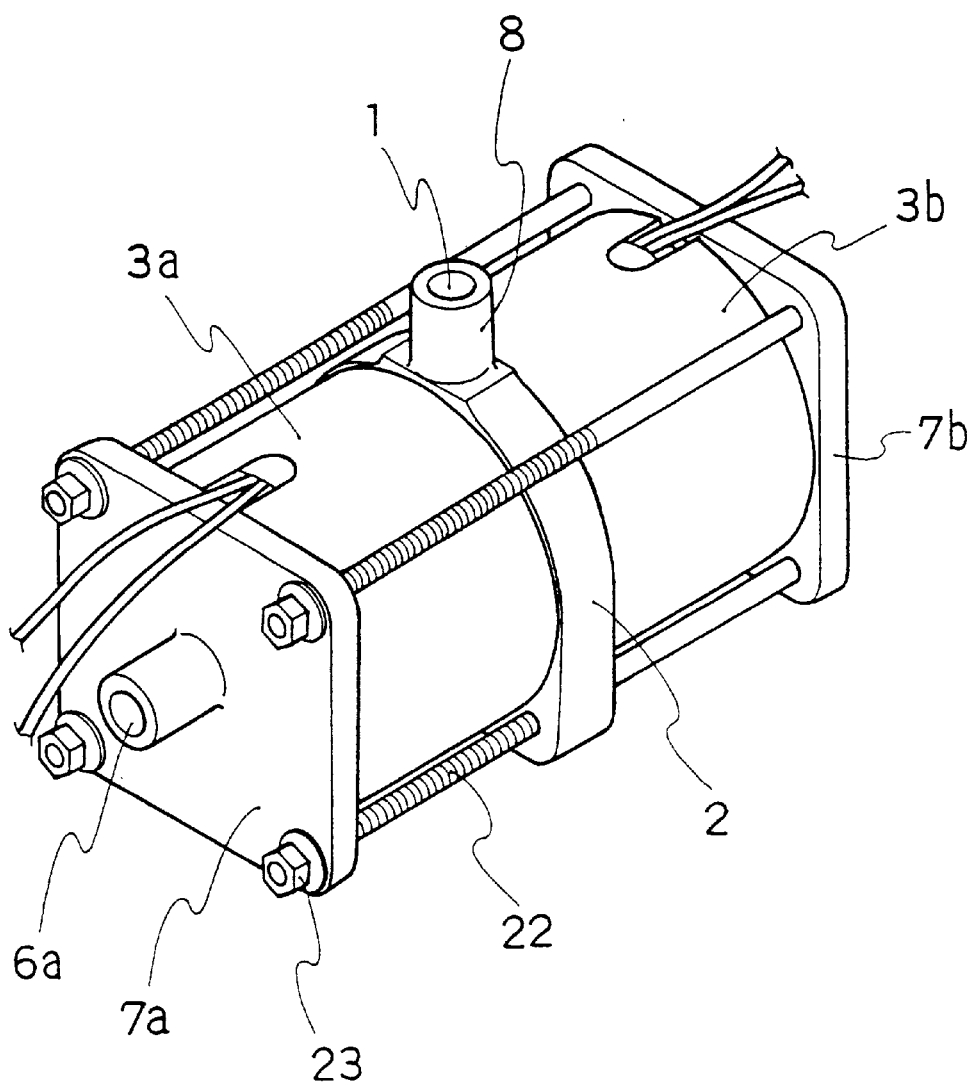
FIG. 1 is a perspective view of a first embodiment of the electromagnetic valve of the present invention.
Figure 2:
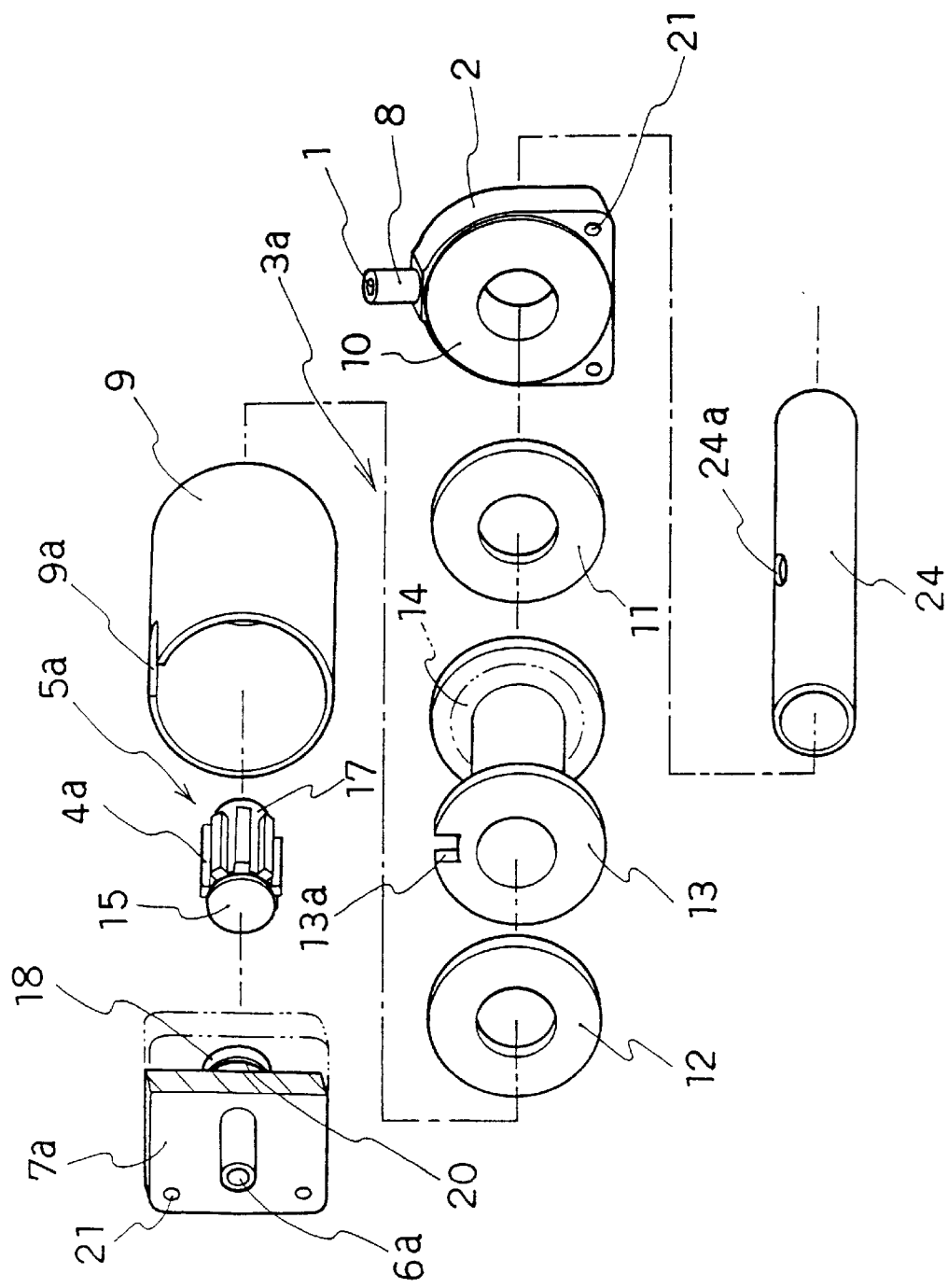
FIG. 2 is an exploded perspective view of disassembled parts of the electromagnetic valve shown in FIG. 1.
Figure 3:
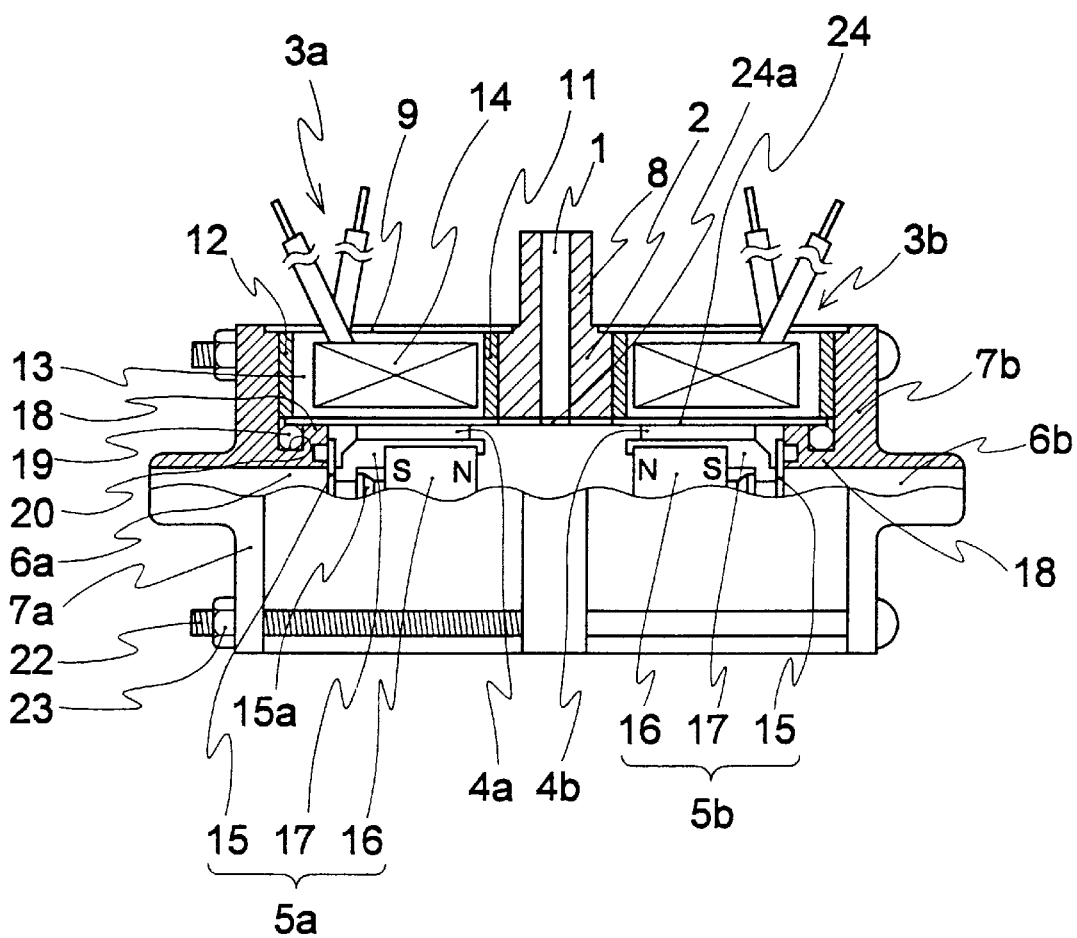
FIG. 3 is a partial sectional view of the electromagnetic valve shown in FIG. 1.

As shown in FIGS. 1 to 3, the electromagnetic valve of an embodiment of the present invention comprises a central supporter 2 having a fluid passage 1, first and second cylindrical electromagnets 3a, 3b which are disposed at both sides of the supporter 2, first and second movable valve members 5a, 5b which are disposed inside the first and second electromagnets 3a, 3b, respectively, and have fluid passages 4a, 4b, respectively, and casings 7a, 7b which are attached to the open ends of the first and second electromagnets 3a, 3b, respectively, and have fluid passages 6a, 6b, respectively. This electromagnetic valve opens and closes the fluid passages by moving the movable valve members 5a, 5b by means of attraction of the electromagnets 3a, 3b.

The fluid passage 1 formed in the central supporter 2 penetrates a nozzle unit 8 and then forks off in the left and right directions in such a manner as to form a T shape. At each side of the central supporter 2, a stepped portion 10 is formed in such a manner as to fit a peripheral yoke 9 thereinto which is a component of each of the electromagnets 3a, 3b. The present embodiment has one nozzle unit, however, the present invention is not restricted to this construction, and can have, for example, two nozzle units. Of the two nozzle units, one can be used for a fluid passage, and the other can be used for connecting with a sensor unit for detecting pressure.

Each of the electromagnets 3a and 3b might comprise a cylindrical peripheral yoke 9, end yokes 11, 12, and an electromagnetic coil 14 which is composed of a synthetic resin bobbin 13 and a copper wire coiled around the bobbin 13 and which is disposed in a space surrounded by these yokes. However, the present invention is not restricted to this construction. For example, it is possible to dispose an electromagnetic coil inside a doughnut-shaped space which is formed by facing end yokes each having U-shaped section, in place of the disk-shaped end yokes. The peripheral yoke 9 and the bobbin 13 have cuts 9a and 13a, respectively, for drawing a copper wire out.

Each of the movable valve members 5a and 5b is composed of a disk-shaped opening valve disc 15, a movable element 16, and a cylindrical holder 17 with a bottom for holding the valve disc 15 and the movable element 16. The fluid passages 4a and 4b of the movable valve members 5a and 5b are formed by concave portions of the cogs or splines of the holder 17. As the material for the holder 17, resins such as polyacetals (Duracon) or polyamide (nylon) which have abrasion-resistance and high rigidity are suitable because the holder 17 slides repeatedly inside the electromagnets 3a, 3b. The valve disc 15 is supported by placing a stem supporting a truncated cone-shaped base unit 15a into a bottom hole of the holder 17 (see FIG. 4). Although the present embodiment uses a disk-shaped valve disc, the shape is not restricted to this. For example, a flexible parasol-shaped valve disc made of synthetic rubber such as EPDM (ethylene propylene diene monomer) can be used.

The movable element 16 is held inside the holder 17 by pressure or adhesion. As the movable element 16, a permanent magnet, such as a cylindrical anisotropic ferrite magnet, or rare earth magnet is used. The movable elements 16 on the left and right sides are disposed in such a manner that the facing poles of the permanent magnets have the same polarity, for example, the north pole. Therefore, in the present embodiment, a normally closed-type electromagnetic valve is formed where the movable valve members 5a and 5b repel each other, and get in contact with the respective valve seat 18 of the casings 7a, 7b, whereby the fluid passages 6a, 6b being closed.

Figure 4:
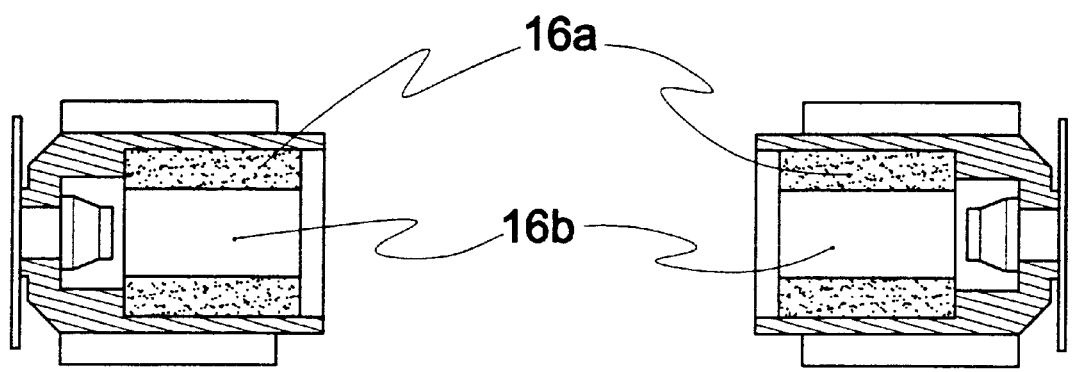
FIG. 4 is a sectional view of another embodiment of a movable element.

The present embodiment uses a cylindrical permanent magnet as a movable element. However, the present invention is not restricted to this. For example, as a movable element, a cylindrical permanent magnet, or a cylindrical permanent magnet 16a into which a cylindrical ferromagnetic member 16b, such as iron, is fitted as shown in FIG. 4, can be used.

The periphery of the valve seat 18 of each of the casings 7a and 7b has a circular groove 20 into which a sealing member 19 such as an O-ring, is designed to be fitted. Also, through holes 21 are formed at each corner of the casings 7a and 7b and the central supporter 2. The casings 7a and 7b, central supporter 2 and two electromagnets 3a and 3b are assembled with the screws 22, which go through the through holes 21, and nuts 23.

The sealing member 19 prevents the internal fluid in operation from leaking from the joint of the casing 7a and the electromagnet 3a and the joint of the casing 7b and the electromagnet 3b. By providing an internal cylinder 24 made of non-magnetic copper, or the like, in the internal circumference of the central supporter 2 and the electromagnets 3a and 3b, the leakage of the internal fluid from the electromagnets 3a and 3b can be prevented, and the heat emitted from the electromagnets 3a and 3b can be cooled. Numeral 24a denotes a fluid passage.

Figure 5:
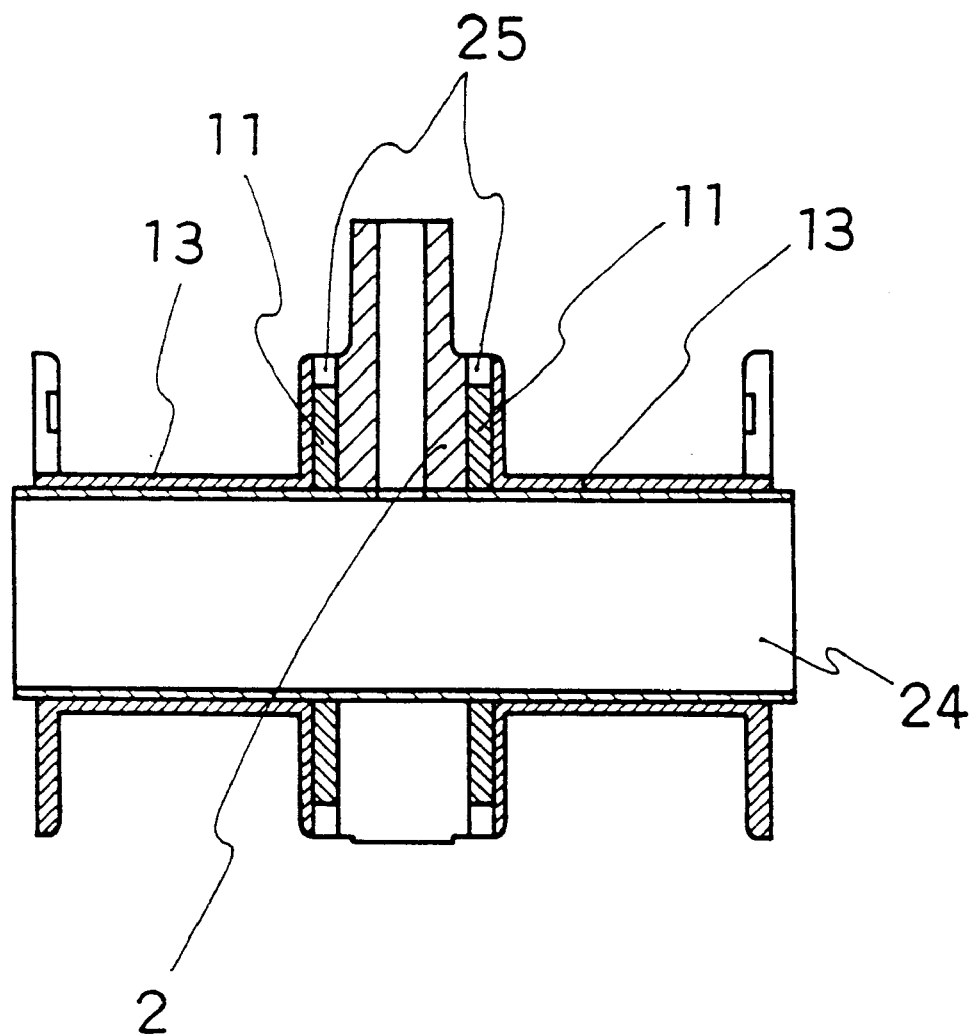
FIG. 5 is a view showing the formation of an end surface yoke and a bobbin integrally as one unit with the internal cylinder.
Figure 6:
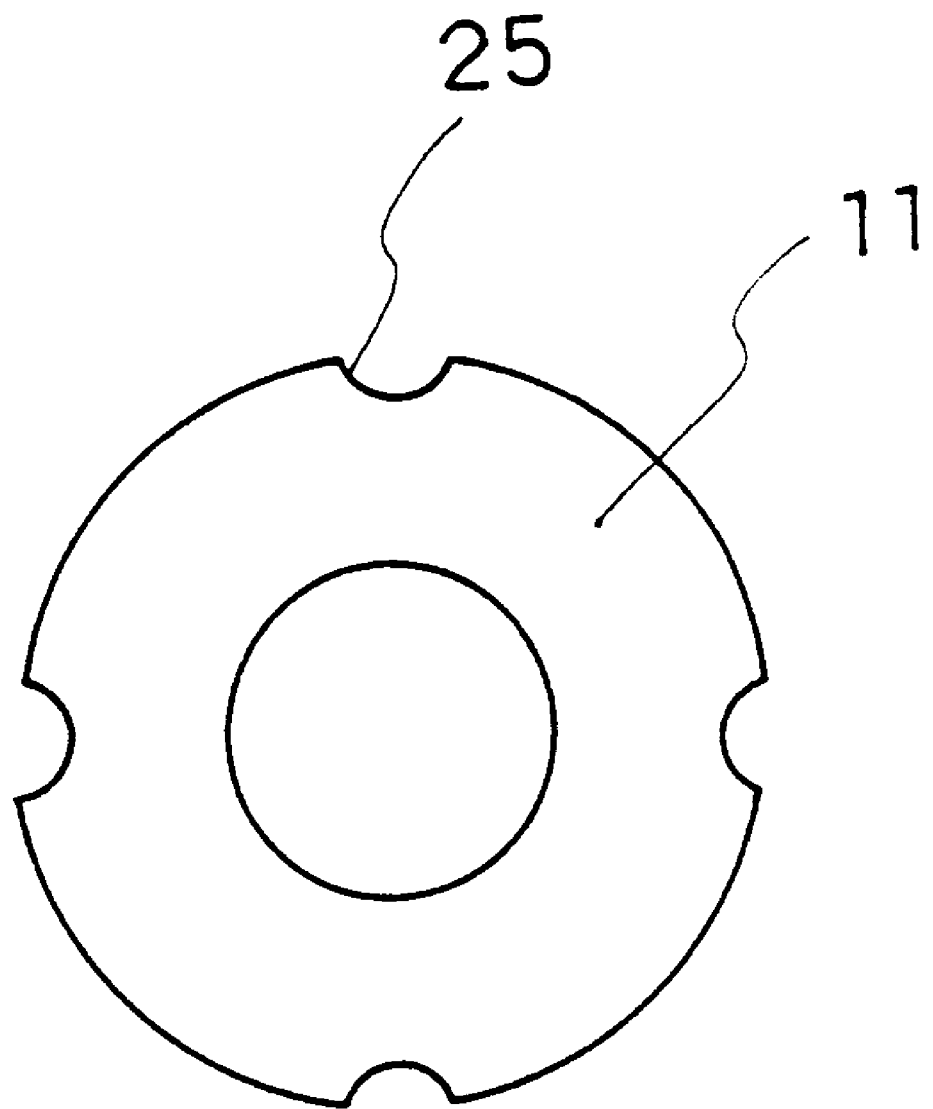
FIG. 6 is a front view of the end surface yoke of FIG. 5.

The central supporter 2, internal end yoke 11, and bobbin 13 are formed separately; however, they can be formed as one unit with the internal cylinder 24 by molding. Such a united formation can reduce the production cost. When they are formed as one unit, as shown in FIGS. 5 to 6, concave portions 25 formed on the periphery of the internal end yoke 11 can be used as a resin passage for connecting the central supporter 2 and the bobbin 13, and after the formation of the concave portions 25, the resin formed in the concave portions 25 reinforces the bobbin 13.

Figure 7:
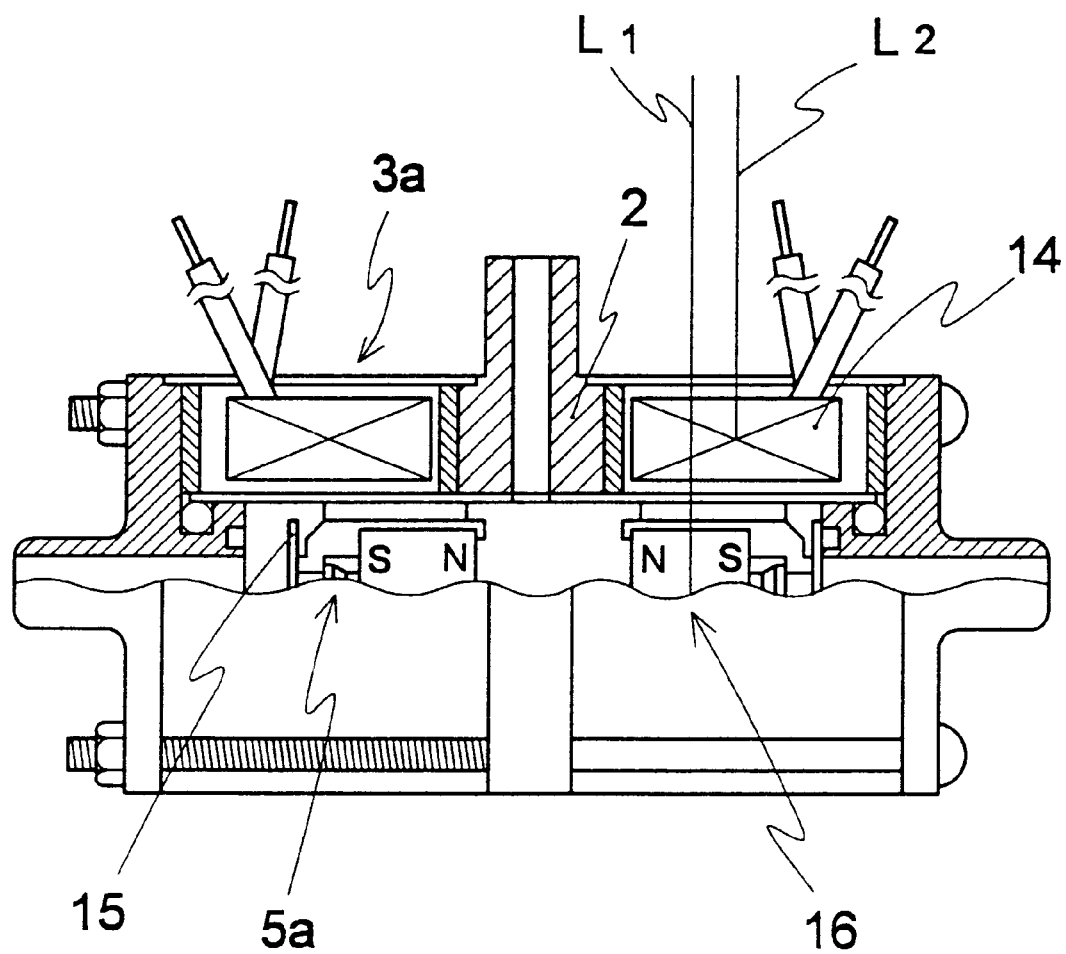
FIG. 7 is a view showing the operation of the electromagnetic valve shown in FIG. 1.

According to the present embodiment, as shown in FIG. 7, when the electromagnet 3a is electrified, the movable element 5a moves towards the central supporter 2, against the replusion, whereby the valve disc 15 being is opened.

As shown in FIG. 7, by setting the center line L1 of the movable element 16 off the center line L2 of the electromagnet coil 14, the attraction and repulsion of the electromagnet and the movable element magnet can be secured. Such an off-set amount is 2 to 3 mm, and it is preferable that the design value of such off-set is determined depending upon fluid pressure.

Figure 8:
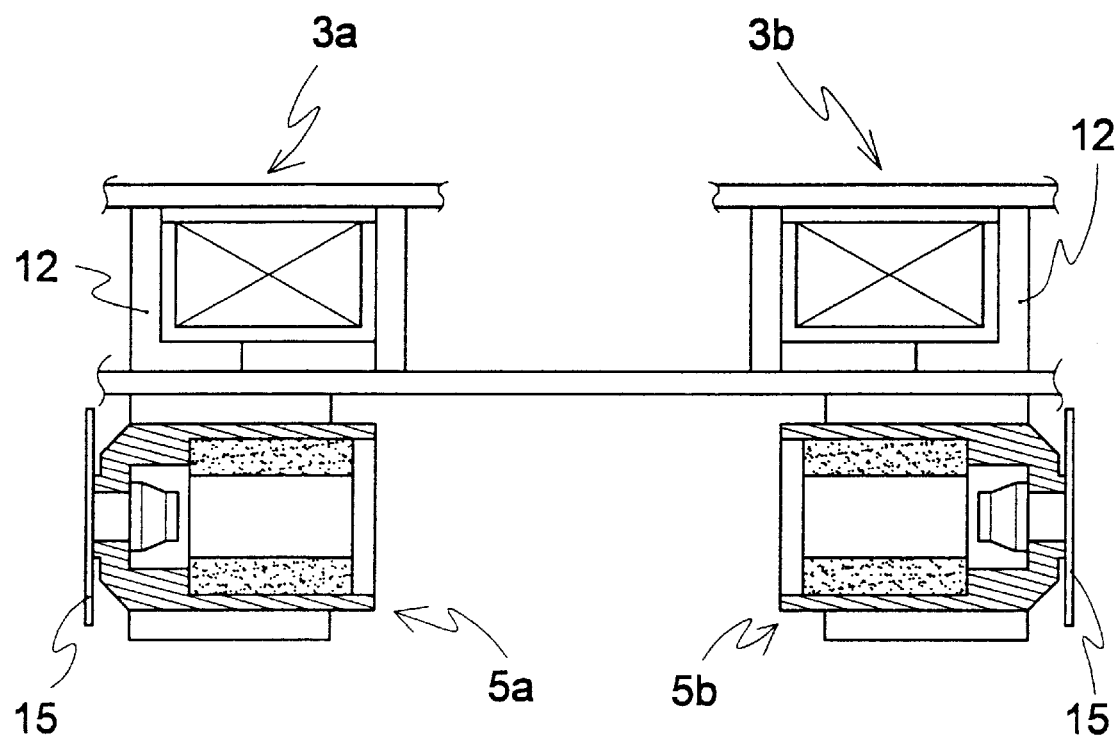
FIG. 8 is a sectional view of another embodiment of the electromagnet.
Figure 9:
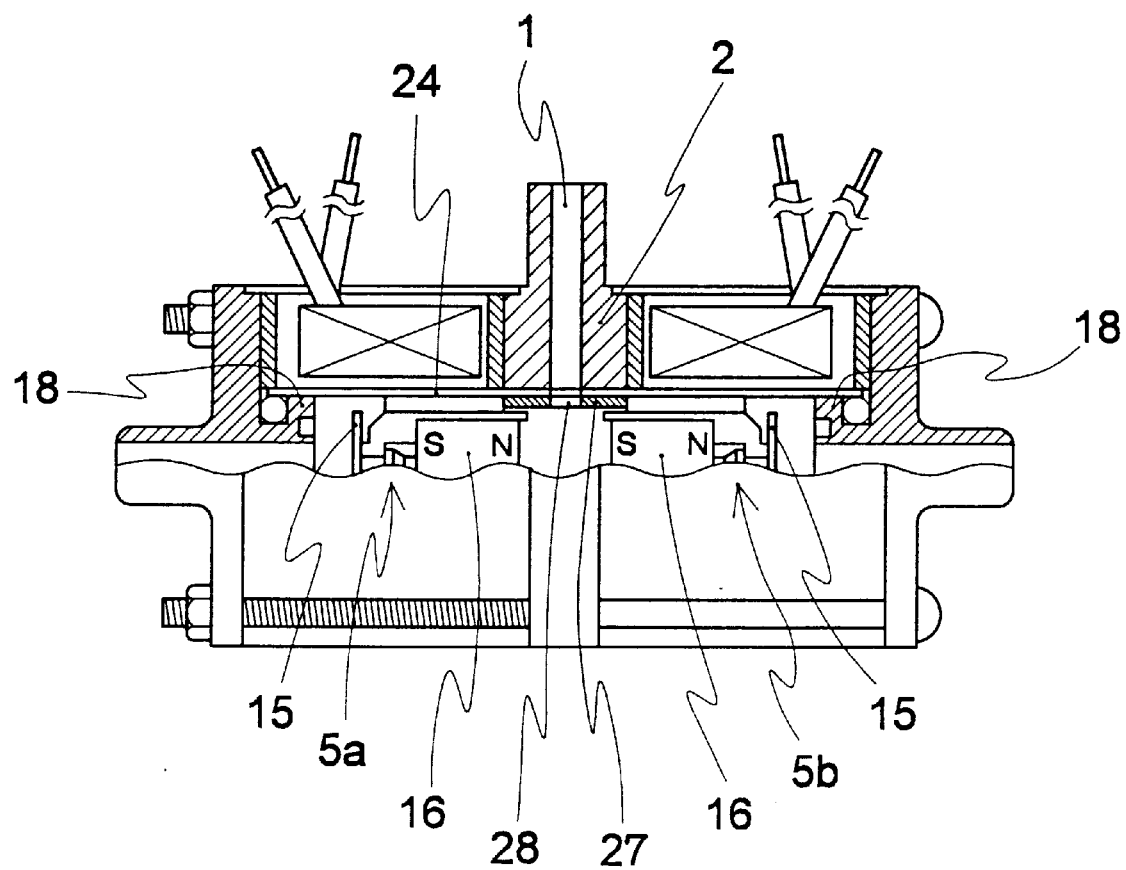
FIG. 9 is a partial sectional view of a third embodiment of the electromagnet valve of the present invention.

As shown in FIG. 8, by making the external end yoke 12 have an L-shaped cross section extending from its internal circumference to the internal circumference of the electromagnet coil 14, the attraction of the movable valve members 5a, 5b when the electromagnets 3a, 3b are electrified, is intensified. As a result, the power required to operate the valve disc 15 can be reduced.

Next, another embodiment of the present invention will be described. The electromagnetic valve of the present embodiment is a normally open-type electromagnetic valve according to which the permanent magnets forming the movable elements 16 of the movable valve members 5a, 5b are disposed so as to attract each other by facing the opposite poles N and S each other, and the valve disc 15 is usually separate from the valve seat 18. In the present embodiment, in order to prevent the movable valves 5a and 5b from attracting each other, it is preferable to put a stopper ring 27 as an attraction-preventing means around the central supporter 2 disposed between the movable valves 5a and 5b, or around the internal cylinder 24 when it is employed. The stopper ring 27 includes a passage 28 which leads to the fluid passage 1.

Figure 10:
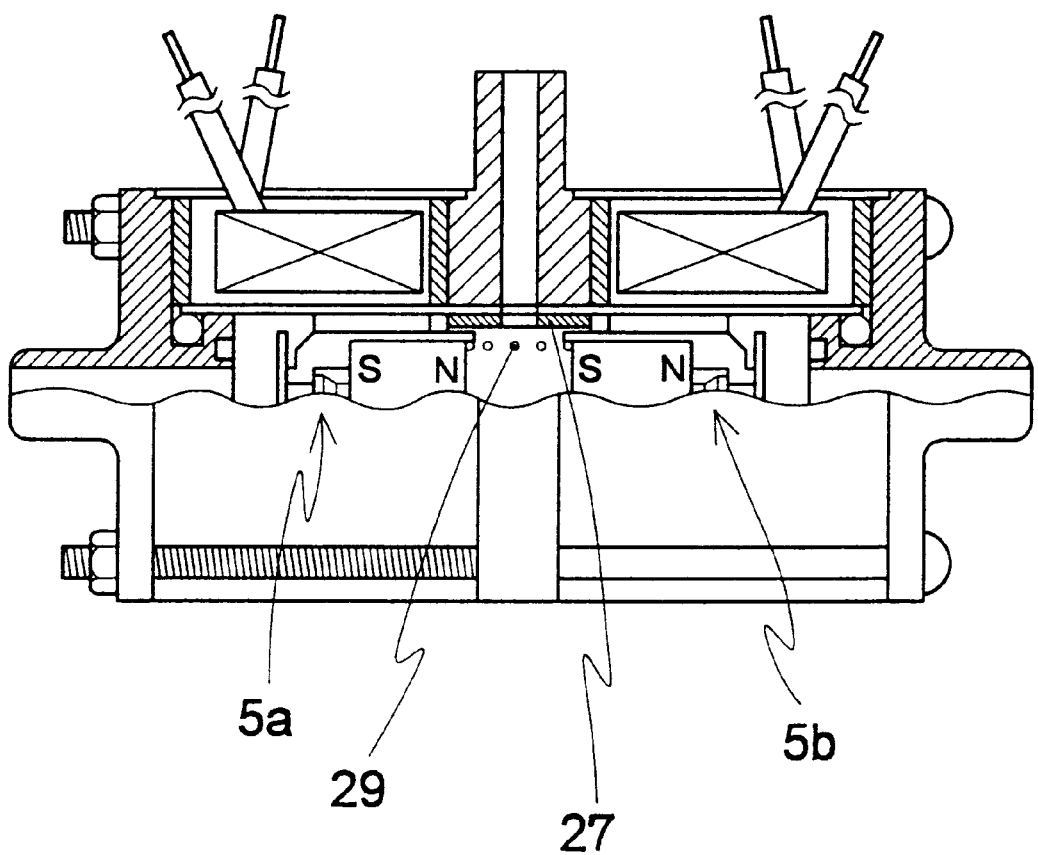
FIG. 10 is a partial sectional view of a fourth embodiment of the attraction-preventing means shown in FIG. 9.

The attraction-preventing means is not restricted to the stopper ring 27. For example, the stopper ring 27 and a spring 29 for adjusting the attracting force can be used between the movable valve members 5a and 5b as shown in FIG. 10. When the attraction between the movable valve members 5a and 5b is prevented by using the stopper ring 27 and the spring 29, it is hard for the spring 29 to keep the balance of the moving amount in the left and right directions of the movable valve members 5a and 5b. Therefore, it is preferable to dispose a spring between the movable valve members 5a within the stopper ring 27, and between the movable valve 5b and the stopper ring 27, respectively.

Figure 11:
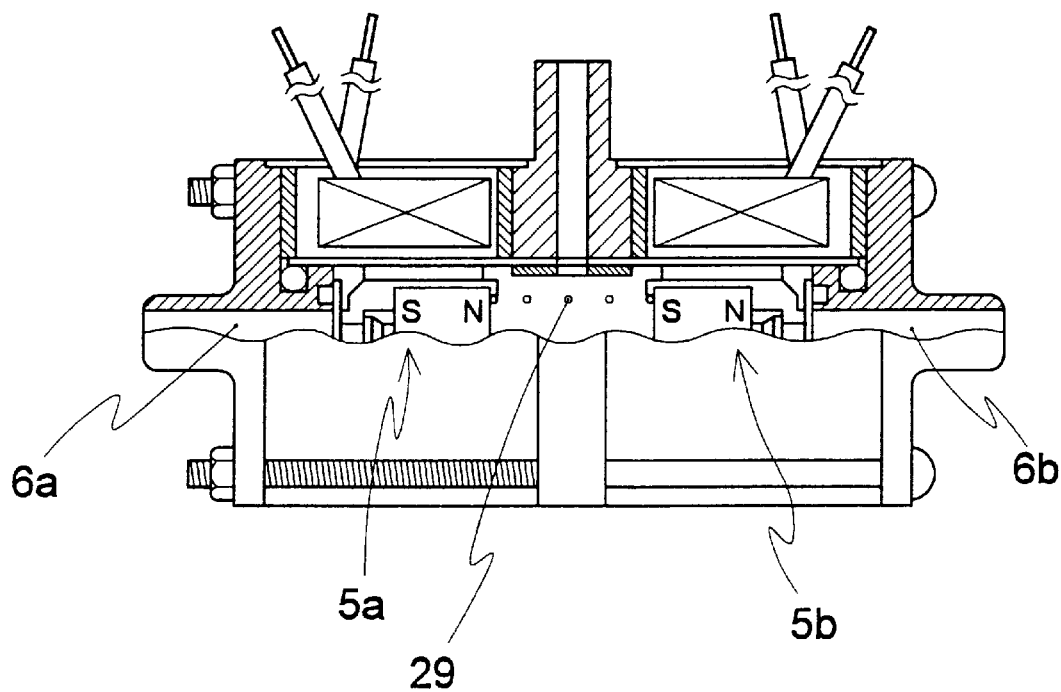
FIG. 11 is a partial sectional view of further a fifth embodiment of the attraction-preventing means shown in FIG. 9.

By intensifying the force of the spring 29, as shown in FIG. 11, the valve disc 15 of each of the movable valve members 5a, 5b is forcibly pressed against the respective valve seat 18, whereby a normally-close-type electromagnetic valve which usually closes the fluid passages 6a, 6b, is being achieved.

Figure 12:
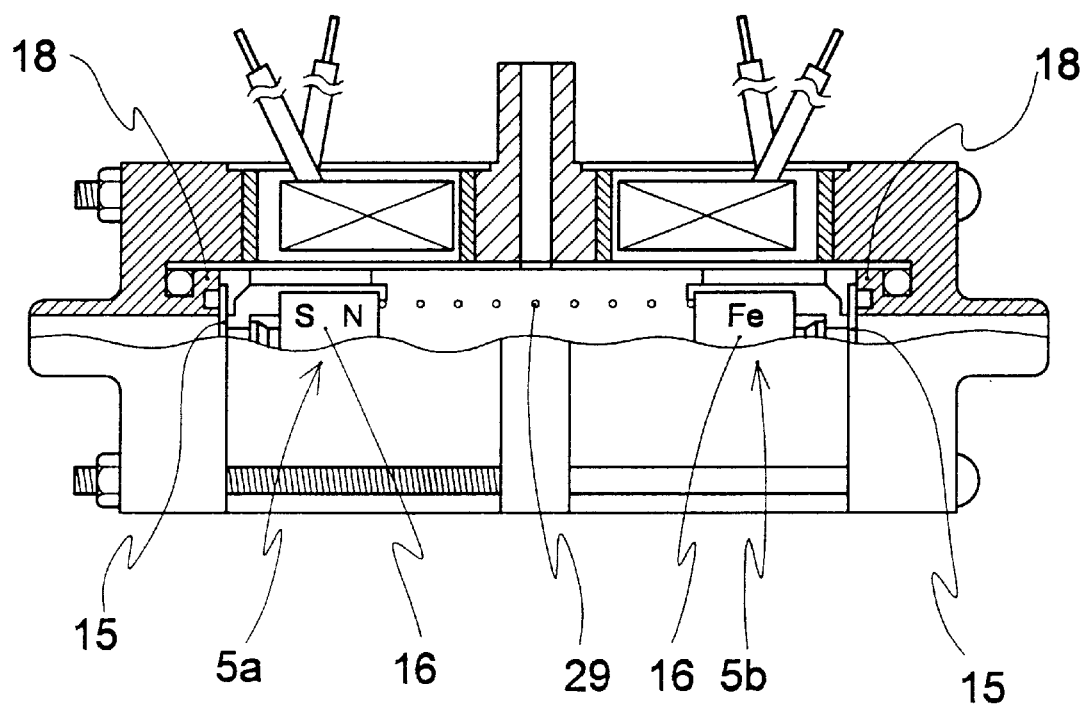
FIG. 12 is a partial sectional view of a sixth embodiment of the electromagnetic valve of the present invention.

Further another embodiment of the present invention will be described. As shown in FIG. 12, the electromagnetic valve of the present embodiment is a normally closed-type electromagnetic valve according to which one of the movable elements 16 of the movable valve members 5a, 5b is a permanent magnet and the other is a ferromagnetic element, such as iron, and a spring 29 as an attraction-preventing means is disposed between the movable valve members 5a and 5b so that the valve discs 15 normally press the valve seats 18.

Figure 13:
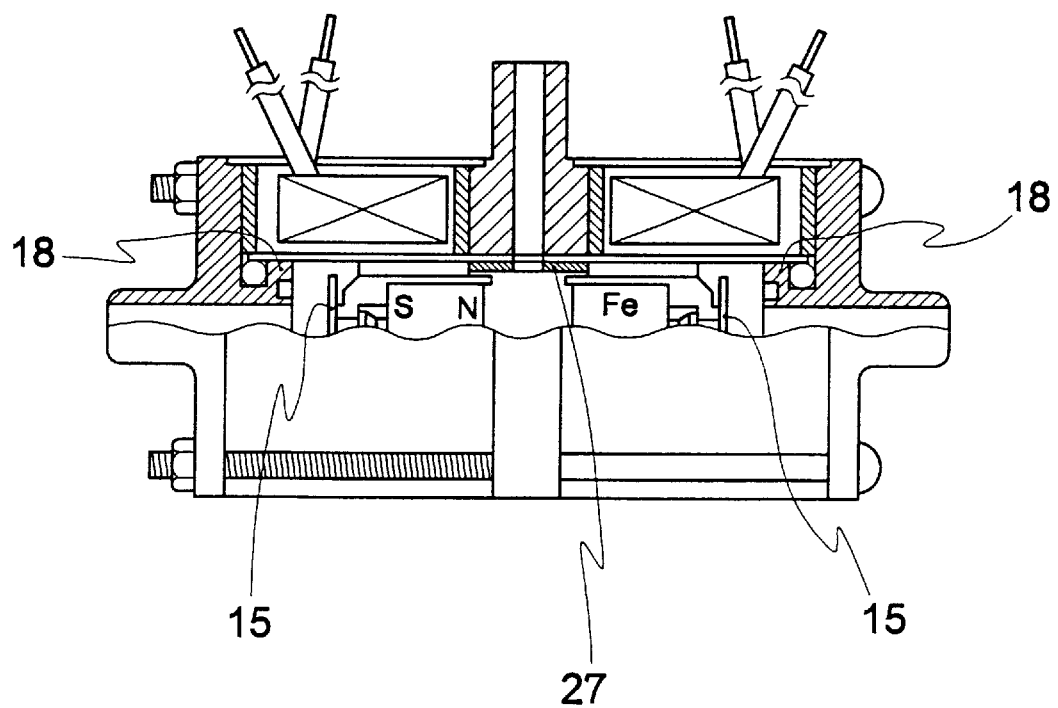
FIG. 13 is a partial sectional view of a seventh embodiment of the attraction-preventing means shown in FIG. 12.

In the present embodiment, the normally close-type electromagnetic valve is formed by using the spring 29 as an attraction-preventing means; however the present invention is not restricted to this construction. As shown in FIG. 13, by using the stopper ring 27 as the attraction-preventing means, a normally open-type electromagnetic valve in which the valve disc 15 is normally separate from the valve seat 18 can be formed.

Figure 14:
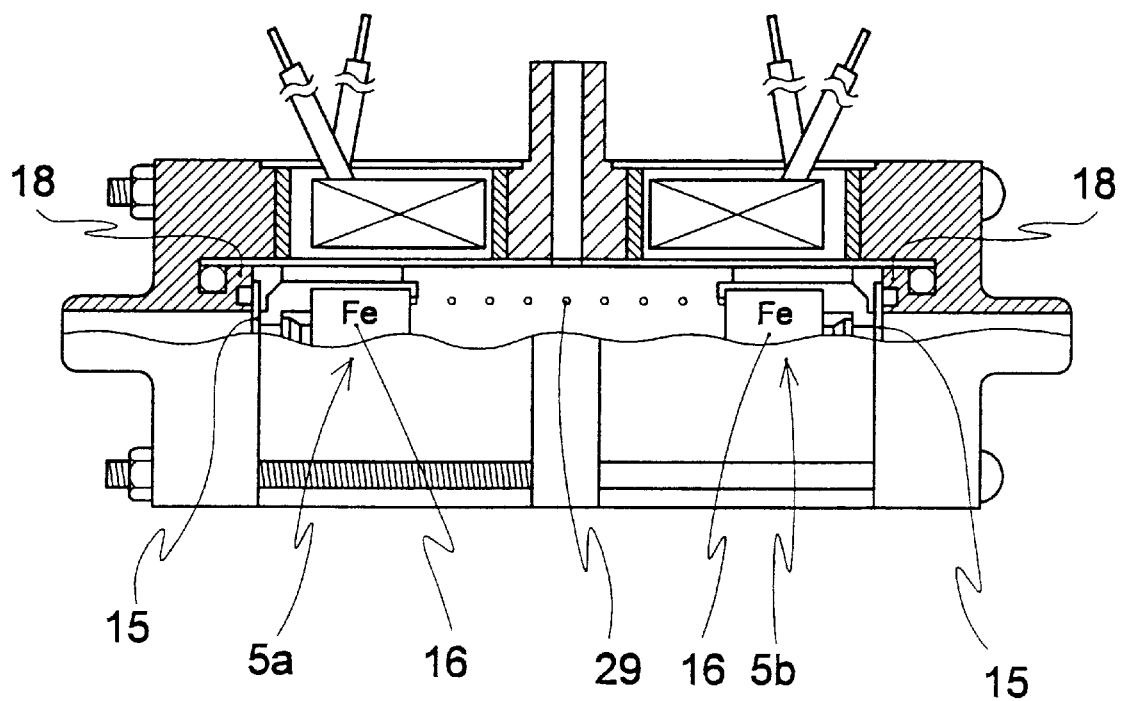
FIG. 14 is a partial sectional view of an eighth another embodiment of the electromagnetic valve of the present invention.

Yet another embodiment will be described. The electromagnetic valve of the present embodiment is a type electromagnetic valve shown in FIG. 14 according to which the movable elements 16 of the movable valve members 5a, 5b are ferromagnetic elements such as iron, and a spring 29 as an attraction-preventing means is disposed between the movable valve members 5a and 5b, so that the valve disc 15 is normally pressed against the valve seat 18.

Figure 15:
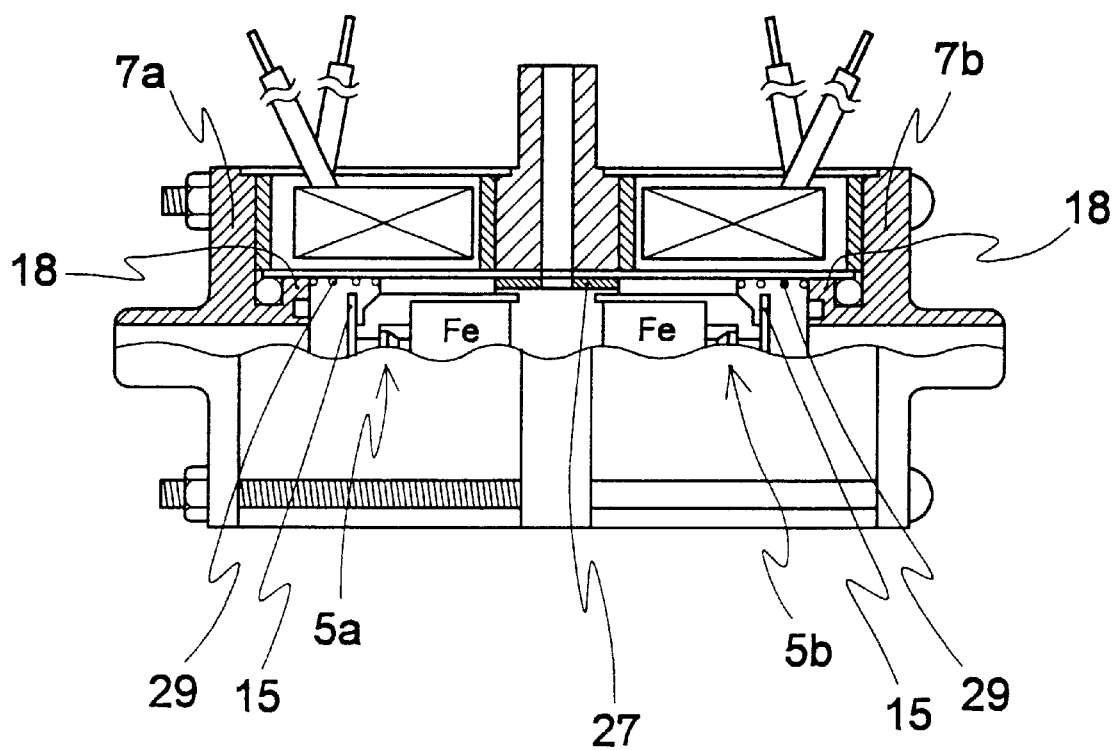
FIG. 15 is a partial sectional view of another embodiment of the attraction-preventing means shown in FIG. 14.

As shown in FIG. 15, a normally open-type electromagnetic valve can be formed according to which a stopper ring 27 is provided as an attraction-preventing means between the movable valve members 5a and 5b, and a spring 29 is provided between the movable valve members 5a and the casings 7a and further between the movable valve members 5b and the casing 7b, so that the valve disc 15 is usually separated from the valve seat 18.

In each of the above-mentioned embodiments, the fluid pressure applied on the moving valve members 5a and 5b changes depending on the size of their diameters (areas), so that the operating voltage of the valves can be changed by modifying the outside diameters of the movable valve members 5a and 5b to an appropriate size. Since the pressure applied from outside is in proportion to the hole diameters (areas) of the fluid passages 6a and 6b in the casings 7a, 7b, the operating voltage of the valve can be changed by modifying the diameters of the fluid passages 6a and 6b of the casings 7a, 7b.

The following is a description of the operation when the electromagnetic valve of the present embodiment shown in FIG. 1 is used for an air mat.

Figure 16A:
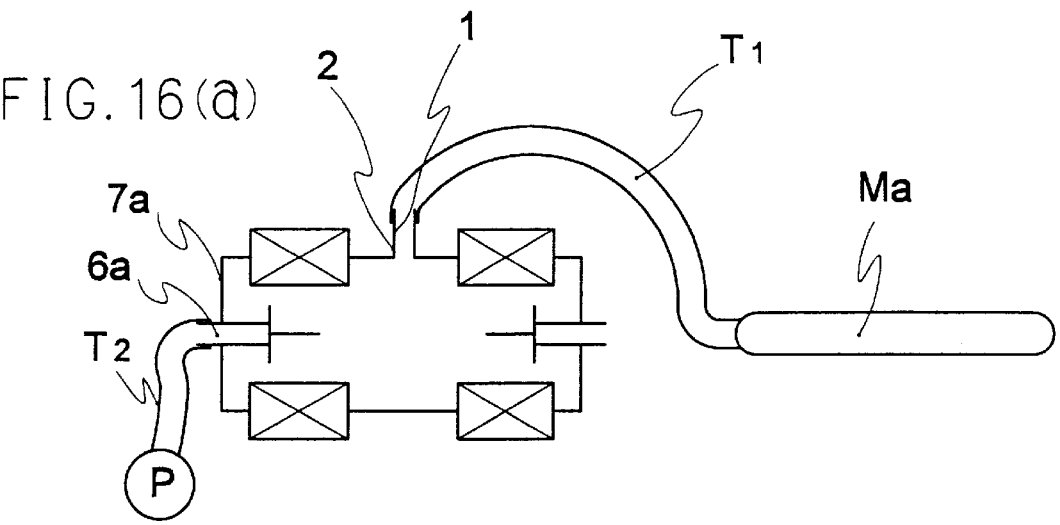
FIGS. 16(a), 16(b) and 16(c) are views showing the operation when the electromagnetic valve of the present invention is used for an air mat.

As shown in FIG. 16(a), a tube T1 of an air mat Ma is connected with a fluid passage 1 of a central supporter 2, and a tube T2 of an air pump P is connected with a fluid passage 6a of the casing 7a.

Figure 16B:
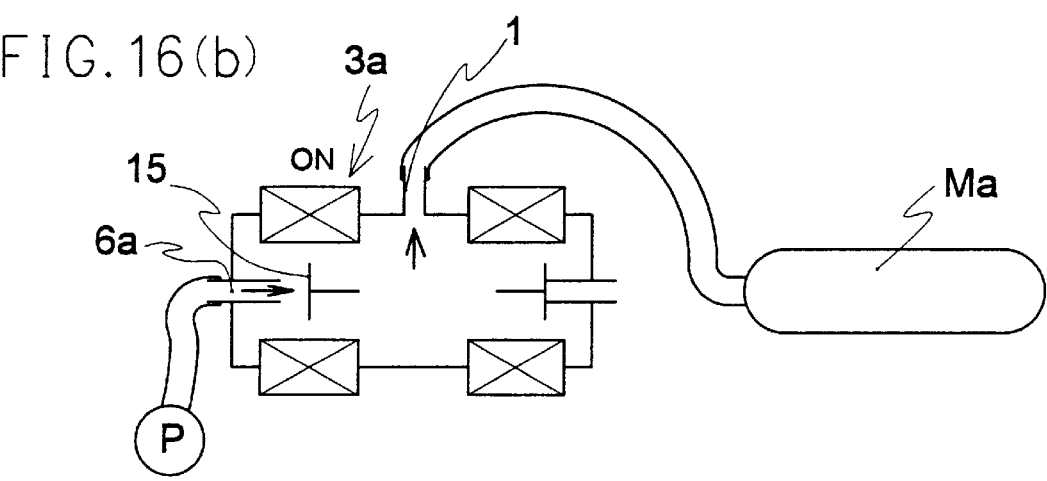

Then, as shown in FIG. 16(b), when an electromagnet 3a is energized, a movable valve member 5a moves towards the center against repulsion of a permanent magnet, so as to open a valve disc 15. Consequently, air travels from the fluid passage 6a to the fluid passage 1, pumping up the air mat Ma.

Figure 16C:
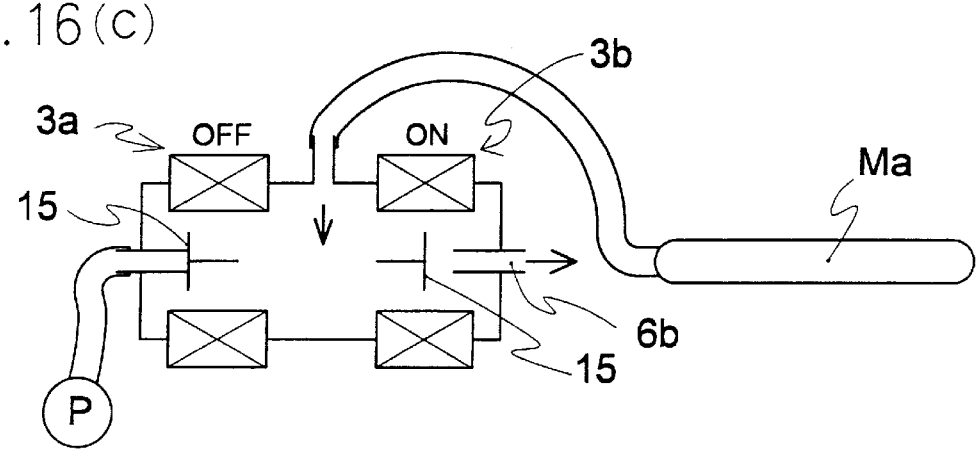

Then, as shown in FIG. 16(c), when the electromagnet 3b is energized after the the electromagnet 3a is deenergized, the valve element carrying disc 15 on the left side moves to the closed position and the valve element carrying disc 15 on the right side moves to the open position. Consequently, air in the air mat Ma is discharged through the fluid passage 1 and the fluid passage 6b, which makes the air mat Ma deflate.

As described hereinbefore, by providing electric supply to the left and right electromagnets alternately, it becomes possible to pump up and deflate the air mat repeatedly.

The following is a description of the case in which the air mat is divided into a plurality of zones, and air is supplied individually to each zone, so as to pump up and deflate the air mat.

Figure 17A:
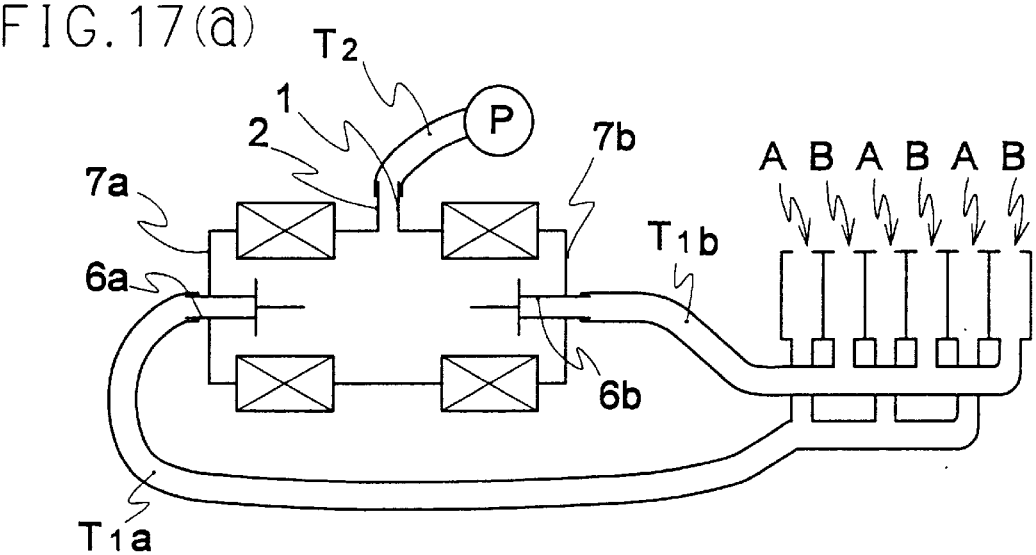
FIGS. 17(a), and 17(b) are views showing the operation when the electromagnetic valve of the present invention is used for another air mat.

First of all, as shown in FIG. 17(a), the tube T2 of the air pump P is connected with the fluid passage 1 of the central supporter 2, the tube T1a for zone A is connected with the fluid passage 6a of the casing 7a, and the tube T1b for zone B is connected with the fluid passage 6b of the casing 7b.

Figure 17B:
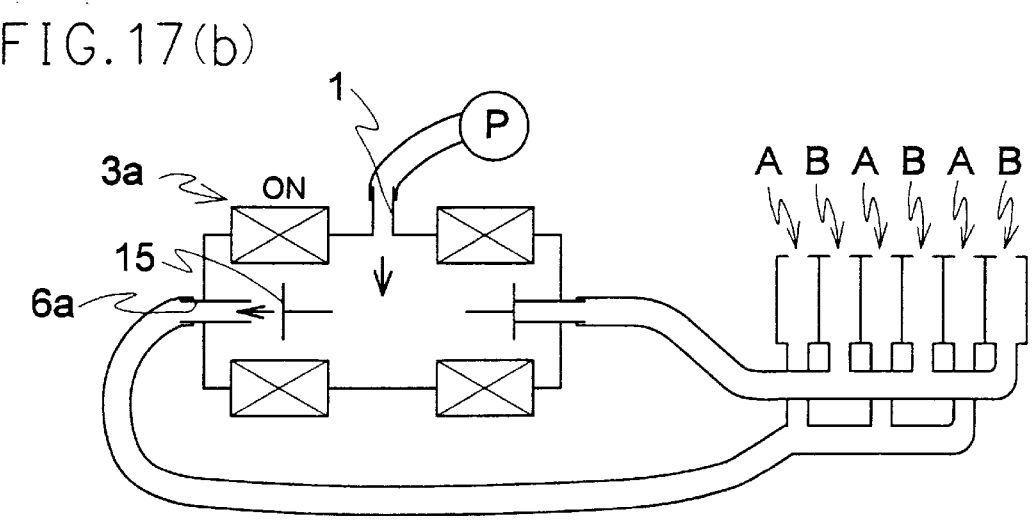

Then, as shown in FIG. 17(b), when the electromagnet 3a is electrified, the valve disc 15 opens and air travels from the fluid passage 1 to the fluid passage 6a, pumping up zone A exclusively.

Figure 18A:
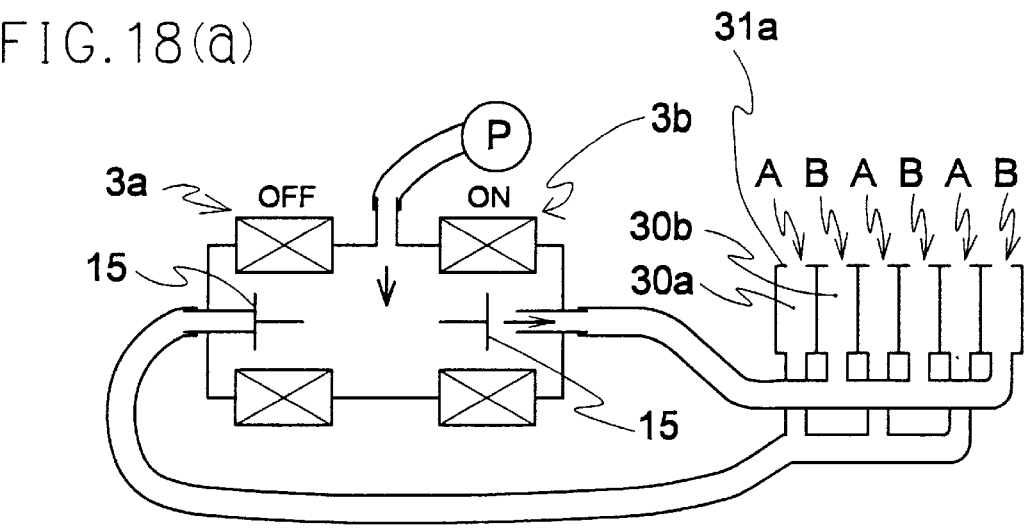
FIGS. 18(a) and 18(b) are views showing the operation when the electromagnetic valve of the present invention is used for yet another air mat.

Then, as shown in FIG. 18(a), when the electromagnet 3b is the electromagnet 3a is deenergized, the valve disc 15 on the left side closes and the valve disc 15 on the right side opens. At this moment, since the air space 30a in zone A, which has a minute air exhaust hole 31a, deflates and the air space 30b in zone B is pumped up.

Figure 18B:
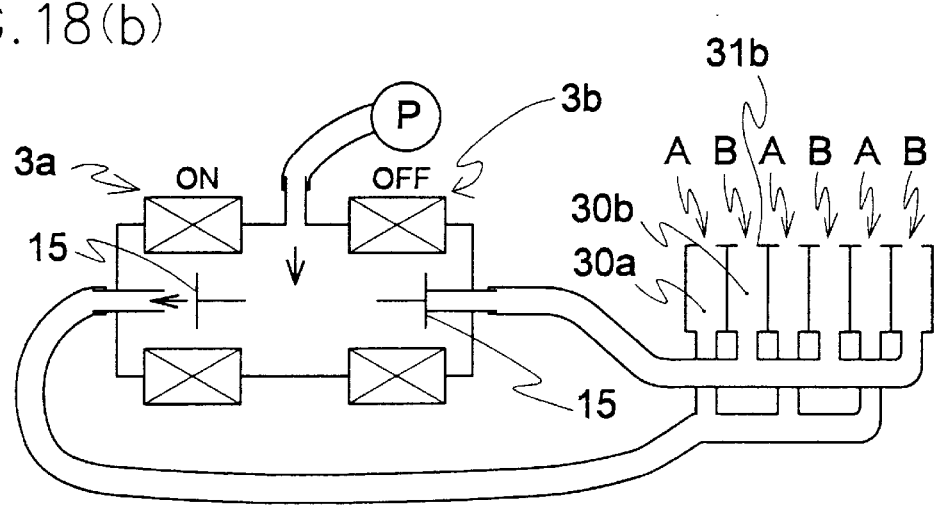

Then, as shown in FIG. 18(b), when the the electromagnet 3b is deenergized after the electromagnet 3a is energized again, the valve disc 15 on the left side opens again and the valve disc 15 on the right side closes. At this moment, since the air space 30b in zone B has a minute air exhaust hole 31b in the same manner as in zone A, the air space 30b deflates whereas the air space 30a in zone A is pumped up.

As mentioned hereinbefore, by performing the electric supply to the left and right electromagnets alternately, it becomes possible to pump up and deflate the adjacent air spaces of the air mat repeatedly.

Such an air mat can be used to prevent so called bedridden patients from suffering congestion caused by pressure being applied on their bodies which are in contact with beds, or bedsores caused by perspiration and grime, or to improve these conditions. In addition, the air mat can be used to eliminate mental stress by providing users with sound sleep.

The electromagnetic valve of each of the abovementioned embodiments can be formed by employing pressing a process and mold formation which demand no cutting process involving numerous processing steps, except for the cutting of the peripheral yoke and the internal cylinder from pipe material. Consequently, the production cost can be reduced. In addition, the use of the internal cylinder makes it possible to prevent air leakage, and the heat generated from the electromagnetic coil of each electromagnet can be discharged because air always travels inside during the operation. Furthermore, the supply and exhaust of fluid and the switching between two directions can be performed.

The following is a description of the electromagnetic valve of yet another embodiment of the present invention. While there are two electromagnets provided in the above-mentioned embodiments, only one electromagnet is provided in the present embodiment.

Figure 19:
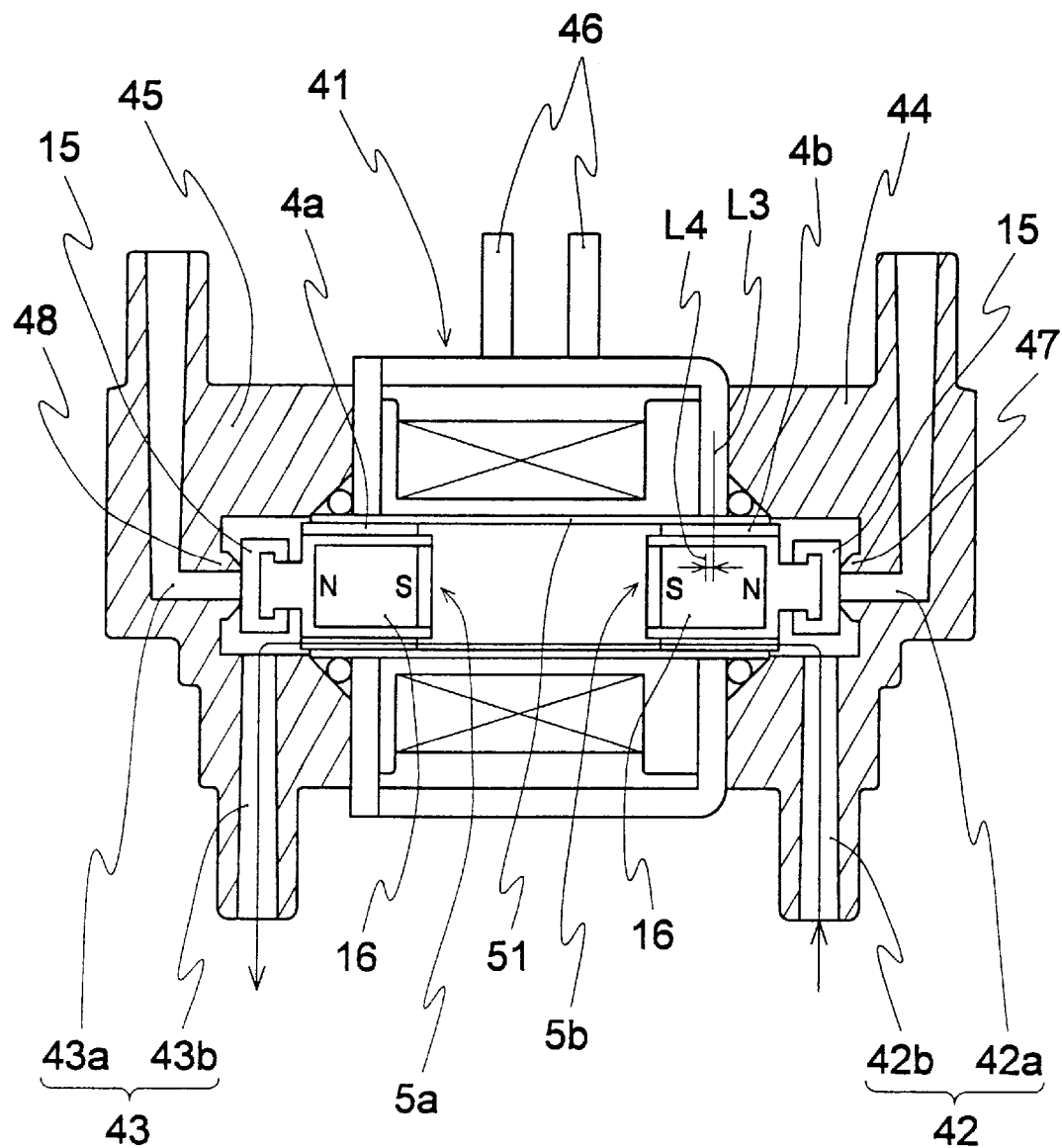
FIG. 19 is a view showing a ninth embodiment of the electromagnetic valve of the present invention.

To be more specific, as shown in FIG. 19, the electromagnetic valve is composed of single cylindrical electromagnet 41, first and second movable valve members 5a, 5b which are disposed inside the electromagnet 41 and which include the fluid passages 4a, 4b, respectively, and casings 44, 45 which are attached to the open ends of the electromagnet 41 and which include the fluid passages 42, 43, respectively.

The fluid passage 42 of the casing 44 is composed of a fluid supply passage 42a leading to an air pump and a fluid supply-exhaust passage 42b leading to an air mat. The fluid passage 43 of the casing 45 is composed of a fluid exhaust passage 43a leading outside and a fluid exhaust passage 43b leading to a pressure detection means, such as a sensor for detecting air pressure of the air mat. The fluid supply-exhaust passage 42b and the fluid exhaust passage 43b communicate with each other all the time. The pressure detection means in the present invention can be of any form as long as it can control the air pressure of the air mat all the time by measuring the air pressure. The electromagnetic coil 41a of the electromagnet 41 is connected energizing coils 46, for example, in order to make the power current be switched by means of a bridge circuit.

The movable elements 16 of the movable valve members 5a, 5b are disposed in such a manner that the facing poles have the same polarity, for example, the S poles as shown. Therefore, when the electromagnetic coil 41a of the electromagnet 41 is not energized, the movable valve members 5a, 5b repel each other so that the respective valve discs 15 contact with the valve seats 47, 48 of the casings 44, 45, whereby the fluid supply passage 42a and the fluid exhaust passage 43a are closed. When repulsion of the movable valve members 5a, 5b is insufficient, it is preferable to dispose a repulsing spring between the movable valve members 5a and 5b.

It is preferable to set the center line L3 of the left and right end yokes 49, 50 of the electromagnet 41 so as to approximately coincide with the center line L4 of the movable elements 16 of the movable valve members 5a, 5b or to provide a slight off-set inside. Consequently, the attraction of the end yokes 49, 50 due to the excitement of the electromagnetic coil 41a applied on each of the movable elements 16 is balanced and the resultant forces on the valve members made outward, to close the valve. As a result, the opening operation of the movable valve members 5a, 5b in the left and right sides can be performed in a stable manner.

Figure 20:
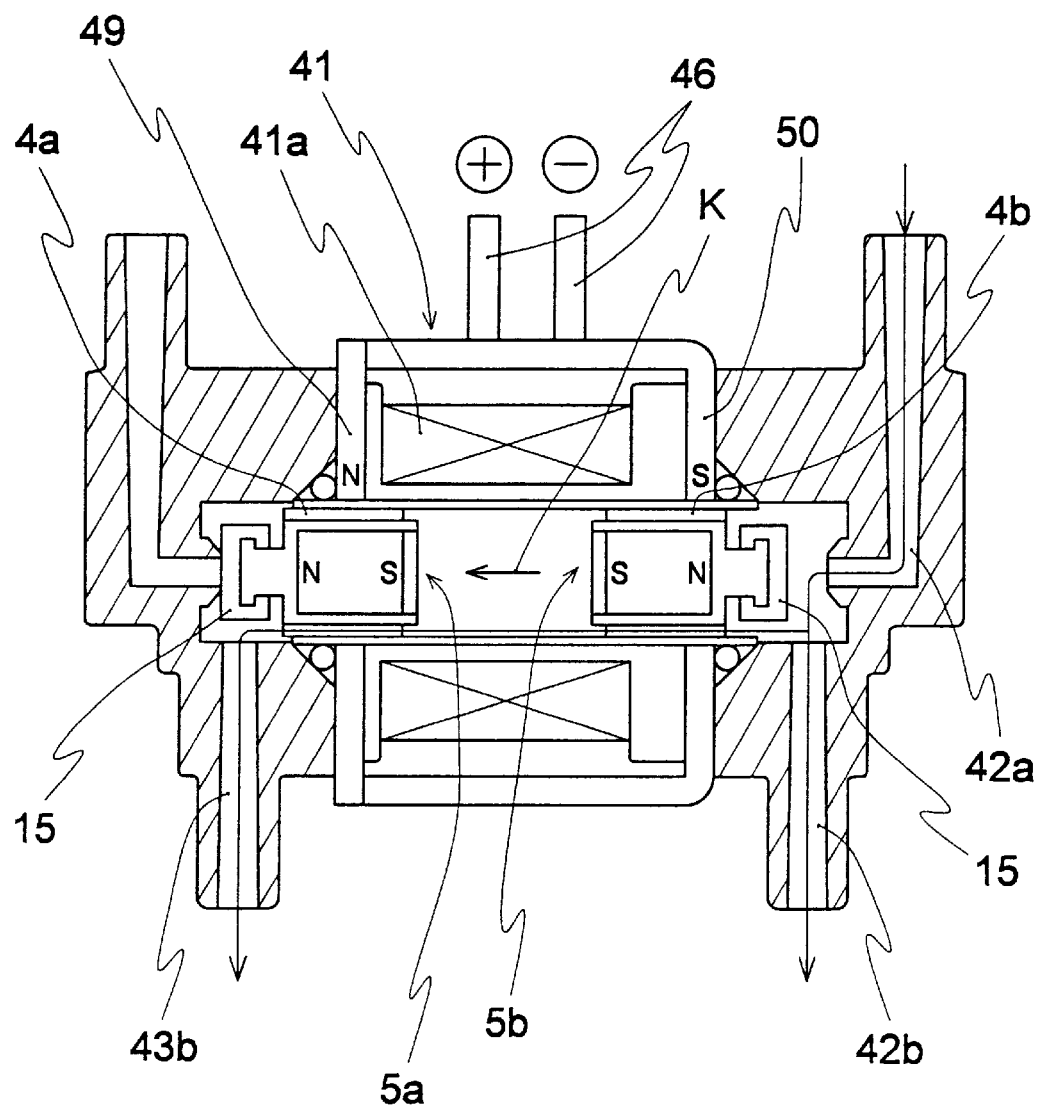
FIG. 20 is a first view showing the operation of the electromagnetic valve shown in FIG. 19.

The following is a description of the operation of the electromagnetic valve of the present embodiment. As shown in FIG. 20, the energizing coils 46 connected with the electromagnetic coil 41a of the electromagnet 41 are electrified with the positive and negative polarities. Consequently, the left end yoke 49 and the right end yoke 50 are excited as an N pole and an S pole, respectively, so that the right-side movable valve member 5b slides in the direction indicated by the arrow K as a result of attraction and repulsion due to the S polarity of the right end yoke 50, and the right-side valve element 15 opens. On the other hand, the left-side movable valve member 5a generates a driving force in the direction indicated by the arrow K as a result of attraction and repulsion of the combination opposite to the movable valve member 5b due to the N polarity of the left end yoke 49, and the left-side valve element 15 remains closed. As a result, the fluid supplied from the pump connected to supply passage 42a passes to the supply-exhaust passage 42b through the supply passage 42a, and then flows to the air mat. At the same time, after passing the fluid passage 4a, 4b from the supply passage 42a, the fluid flows to the exhaust passage 43b.

Figure 21:
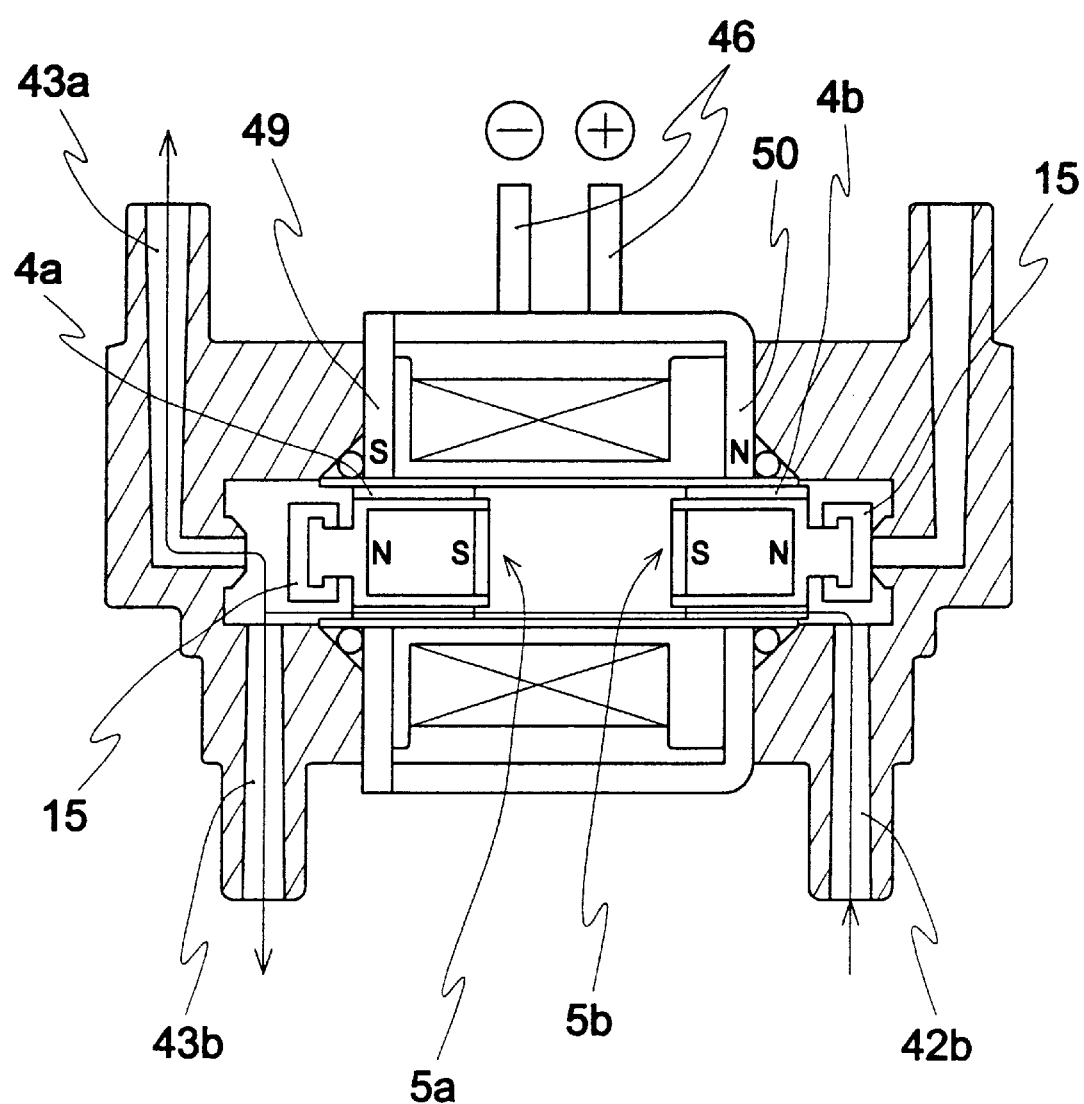
FIG. 21 is a second view showing the operation of the electromagnetic valve shown in FIG. 19.

Then, as shown in FIG. 21, the energizing coils 46 are energized to have the polarities opposite to the above-mentioned positive and negative polarities by switching power current. Consequently, the polarity of the left end yoke 49 and the polarity of the right end yoke 50 are reversed, so that the opening operation of the movable valves 5a, 5b shown in FIG. 20 is reversed: the right-side valve element 15 closes and the left-side valve element opens. As a result, the fluid from the air mat passes the fluid passage 4a, 4b of the movable valves 5a, 5b through the supply-exhaust passage 42b, and then splits off into the fluid exhaust passage 43a and the fluid exhaust passage 43b.

Since the present embodiment uses one electromagnet, the number of components and the number of assembling stages are reduced almost in half, as compared with the above-mentioned embodiments, which leads to reduction in production cost. Furthermore, in the present embodiment, the left and right nozzles are the inlets for air which are not located in the center position unlike the two-coil type and the electromagnet is one unit, so that the internal cylinder 51 becomes dispensable. As a result, the production cost can be further reduced.

The following is a description of the electromagnetic valve of yet another embodiment of the present invention. The present embodiment is different from the above-mentioned embodiments in that the fluid passage is formed in an electromagnet.

Figure 22:
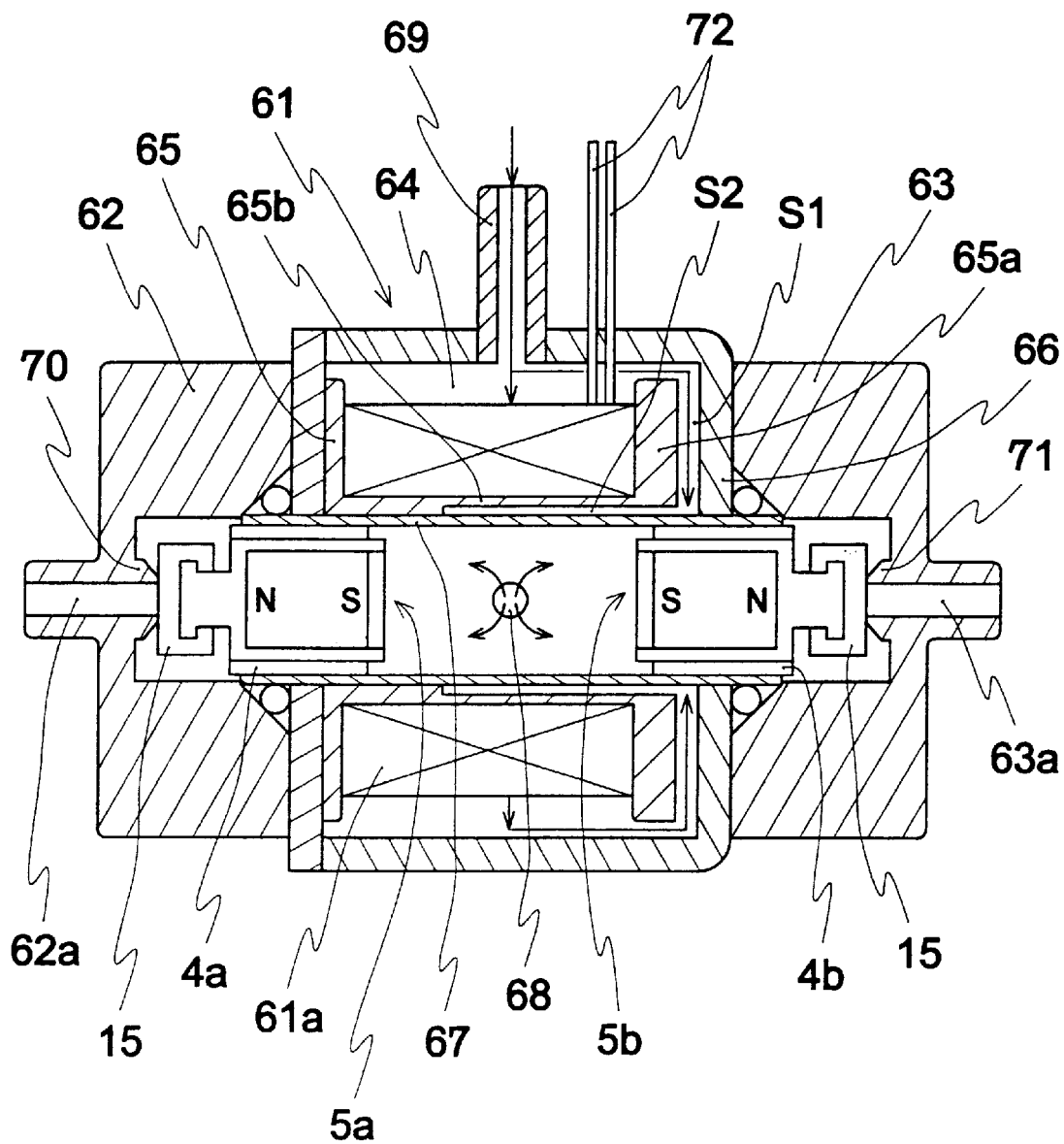
FIG. 22 is a sectional view showing a tenth embodiment of the electromagnetic valve of the present invention.
Figure 23:
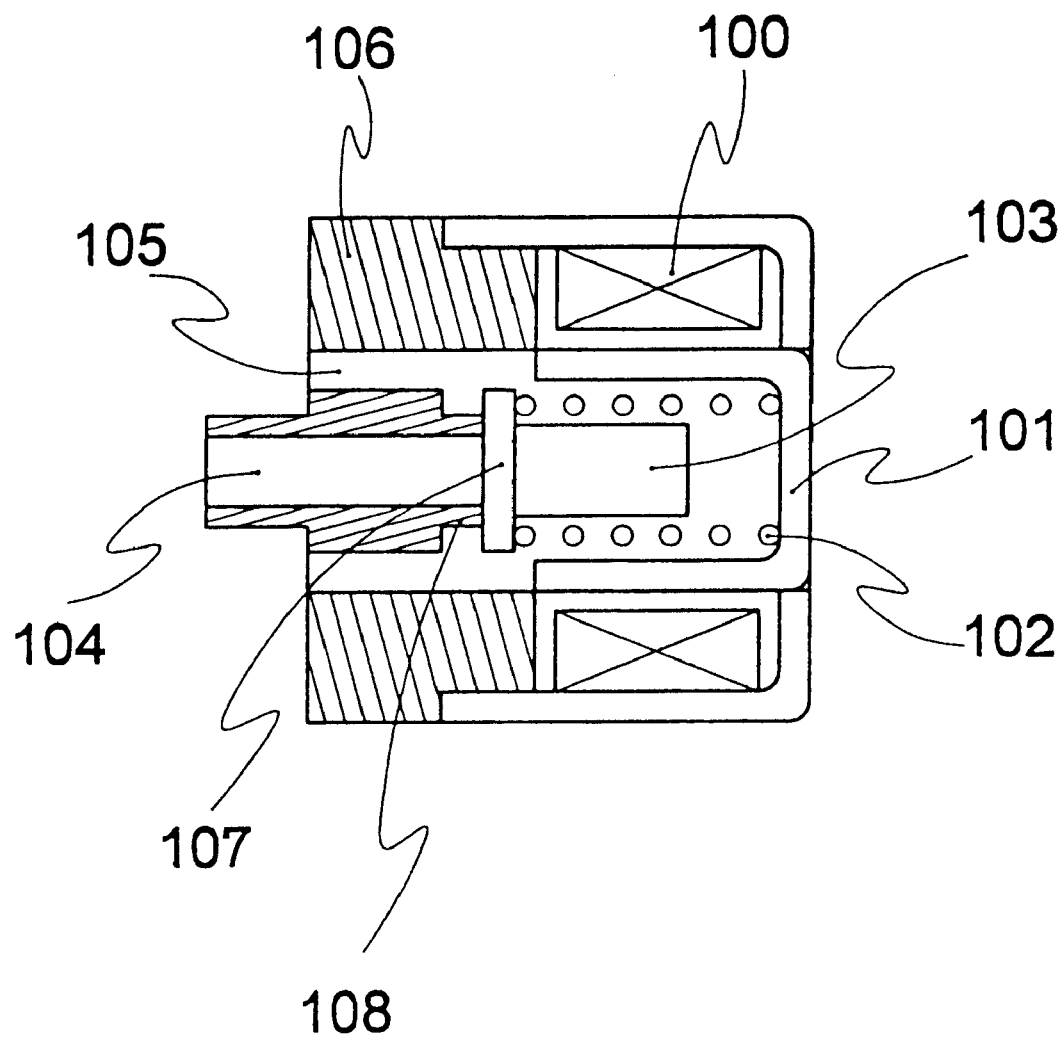
FIG. 23 is a sectional view of an example of a conventional electromagnetic valve.

To be more specific, as shown in FIG. 22, the electromagnetic valve is composed of a cylindrical electromagnet 61, first and second movable valve members 5a, 5b which are disposed inside the electromagnet 61 and which include the fluid passages 4a, 4b, respectively, and casings 62, 63 which are attached to the open ends of the electromagnet 61 and which include the fluid passages 62a, 63a, respectively. The electromagnet 61 includes a fluid passage 64 which runs between the first and second movable valve members 5a, 5b. The fluid passage 64 of the electromagnet 61 can be composed of a gap S1 formed between the right-end wall 65a of the bobbin 65 having a U-shaped cross section and the right-end yoke 66 and a gap S2 formed between the internal circumference wall 65b with a step of the bobbin 65 and the internal cylinder 67. The fluid passage 64 runs between the movable valves 5a, 5b through the air hole 68 of the internal cylinder 67.

Thus, according to the present embodiment, the movable valve members 5a and 5b are adapted to contact the valve seats 70, 71, respectively, of the casings 62, 63, respectively, by mutual repulsion and by the pressure of air which is supplied between the movable valve members 5a, 5b from the nozzle 69 through the fluid passage 64 and the air hole 68, whereby a normally closed-type electromagnetic valve which usually closes the fluid passages 62a, 63a is formed. It is possible to provide a pressure detection means, such as a sensor which can control air pressure of the air mat all the time by forming a fluid exhaust passage at the electromagnet 61 and measuring the air pressure of the air mat at the fluid exhaust passage.

According to the present embodiment, the movable valve members 5a, 5b are applied air pressure in addition to their repulsion, so that the air tightness between the valve discs 15 and the valve seats 70, 71 is improved as compared with the electromagnetic valve shown in FIG. 19. As a result, air leakage can be prevented. Furthermore, the provision of a repulsing spring between the first and second movable valve members 5a, 5b makes it possible to further prevent air leakage. Also according to the present embodiment, the air supplied to the fluid passage 64 directly cools the coiled wire of the electromagnetic coil 61a, so that a temperature rise of the electromagnetic coil 61a which is caused when the energizing coils 72 connected with the electromagnetic coil 6 1a are energized at the positive and negative polarities can be suppressed.

As described hereinbefore, according to the present invention, the first and second movable valve members are disposed in the fluid passage inside the electromagnet, so that supply and exhaust of fluid, and switching between two directions can be performed.

What is claimed is:

1. An electromagnetic valve comprising:
    a casing structure defining an axially elongated interior chamber,
    casing end closures closing opposite ends of said interior chamber and containing passages communicating with each end of said chamber,
    valve seats formed within said chamber on the ends of said end closure passages,
    a pair of oppositely movable magnetic valve members disposed within said interior chamber, each said valve member being cooperable with said valve seats to open and close said end closure passages to establish fluid communication with said interior chamber,
    a central supporter disposed intermediate the ends of said casing, said central supporter having a fluid passage extending between, and communicating at one end with, said interior chamber intermediate said movable valve members and at the other end with the exterior of said casing, and
    electromagnetic coil means surrounding said casing and being operative, upon energization, to selectively move said valve members with respect to the respective valve seats.

2. The electromagnetic valve according to claim 1 in which said movable magnetic valve members each contain a magnetic movable element and a holder, said holder supporting said magnetic movable element and being operative to mount a valve disc to cooperate with said valve seats to open and close said end closure passages.

3. The electromagnetic valve according to claim 1 including first and second electromagnets disposed on opposite sides of the supporter, and said valve elements having fluid passages for passing fluid across each valve member.

4. The electromagnetic valve according to claim 1 including means for preventing attraction between said movable valve members disposed within said chamber.

5. The electromagnetic valve according to claim 4 in which one of the movable elements of said movable valve members is a permanent magnet and the other is a ferromagnetic element.

6. The electromagnetic valve according to claim 5 in which the permanent magnet is a hollow cylindrical member and concentrically encloses a cylindrical ferromagnetic member.

7. The electromagnetic valve according to claim 4 in which each of the movable elements of said movable valve members is a ferromagnetic element.

8. The electromagnetic valve according to claim 7 in which said attraction preventing means is disposed between each of said ferromagnetic elements and said casing.

9. The electromagnetic valve according to any one of claims 1 to 8 including an internal cylinder formed of non-magnetic material concentrically disposed within said central supporter and said electromagnetic coil means.

10. The electromagnetic valve according to claim 9 including an internal end yoke and a bobbin for supporting said electromagnetic coil means and wherein said end yoke, said bobbin and said central supporter are integrally formed with the internal cylinder by molding.

11. The electromagnetic valve according to any one of claims 3 to 7 in which said electromagnets are each provided with an end yoke having an L-shaped cross-section.

12. The electromagnetic valve according to any one of claims 3 to 8 wherein a center line of the electromagnetic coils of each of said electromagnets is normally offset from a center line of the movable element of the associate valve member.

13. The electromagnetic valve according to any one of claims 2, 3 and 4 in which the valve disc is flexible and parasol-shaped.

14. The electromagnetic valve according to claim 1 in which each said electromagnetic coil means is formed as a cylindrical electromagnet concentrically surrounding said movable valve elements.

15. The electromagnetic valve according to claim 14 in which said movable magnetic valve members each contain a magnetic movable element and a holder, and the holder being operative to hold a valve disc for opening and closing the valve.

16. The electromagnetic valve according to claim 15 in which said valve elements have fluid passages for passing fluid across each valve member.

17. The electromagnetic valve according to claim 16 in which each of the movable elements of said valve members comprise a permanent magnet and said movable elements are disposed such that facing poles of the permanent magnets have the same polarity.

18. The electromagnetic valve according to any one of claims 15 to 17 in which the valve disc is flexible and parasol-shaped.

19. The electromagnetic valve according to claim 17 in which the permanent magnet is cylindrical and concentrically encloses a cylindrical ferromagnetic member.

20. The electromagnetic valve according to any one of claims 14 to 17 including a pressure detection member disposed at a passage of the valve forming an exhaust passage.

21. The electromagnetic valve according to any one of claims 14 to 17 including a repulsing spring disposed between and engaging said movable magnetic valve members.

22. The electromagnetic valve according to claim 14 including a fluid passage formed in said electromagnet communicating with said chamber intermediate said movable magnetic valve members.

23. The electromagnetic valve according to claim 22 in which said movable magnetic valve members each contain a magnetic movable element and a holder, the holder being operative to hold a valve disc for opening and closing the valve.

24. The electromagnetic valve according to claim 23 including a repulsing spring disposed between said movable magnetic valve members.

25. The electromagnetic valve according to any one of claims 23 and 24 in which said valve disc is flexible and parasol-shaped.

26. The electromagnetic valve according to claim 25 in which said magnetic movable element comprises a cylindrical permanent magnet concentrically enclosing a cylindrical ferromagnetic member.

27. The electromagnetic valve according to any one of claims 22 to 24 including a pressure detection means disposed at said passage in said electromagnet.

28. The electromagnetic valve according to any one of claims 22 and 23 including a repulsing spring between said movable magnetic valve members.

* * * * *